(12) United States Patent
Zhao et al.

(10) Patent No.: US 7,688,359 B2
(45) Date of Patent: Mar. 30, 2010

(54) METHOD FOR ACQUIRING AND CONTROLLING AUTOMATIC EXPOSURE CONTROL PARAMETERS AND IMAGING DEVICE

(75) Inventors: Guangyao Zhao, Shenzhen (CN); Xiaoxia Wei, Shenzhen (CN); Jing Wang, Shenzhen (CN); Haitao Yang, Xi'an (CN); Yilin Chang, Xi'an (CN)

(73) Assignee: Huawei Technologies Co., Ltd., Shenzhen, Guangdong District (CN)

( * ) Notice: Subject to any disclaimer, the term of this patent is extended or adjusted under 35 U.S.C. 154(b) by 495 days.

(21) Appl. No.: 11/616,248

(22) Filed: Dec. 26, 2006

(65) Prior Publication Data

US 2007/0263097 A1    Nov. 15, 2007

(30) Foreign Application Priority Data

Apr. 30, 2006    (CN) .................... 2006 1 0079646

(51) Int. Cl.
*H04N 5/235* (2006.01)
*H04N 5/228* (2006.01)
*H04N 9/73* (2006.01)
*H04N 5/238* (2006.01)
*G03B 7/00* (2006.01)

(52) U.S. Cl. .............. 348/229.1; 348/222.1; 348/221.1; 348/362; 348/364; 348/223.1; 396/213

(58) Field of Classification Search .............. 348/221.1, 348/362–364, 208.12, 222.1, 229.1, 335, 348/246
See application file for complete search history.

(56) References Cited

U.S. PATENT DOCUMENTS 5,111,301 A * 5/1992 Haruki et al. ............... 348/364
5,194,960 A * 3/1993 Ota ........................... 348/362
5,579,049 A * 11/1996 Shimaya et al. ............. 348/364
5,848,181 A * 12/1998 Ogata ........................ 382/169

(Continued)

FOREIGN PATENT DOCUMENTS

WO    WO 2006-025574 A1    3/2006

OTHER PUBLICATIONS

Haruki, Toshinobu et al., "Video Camera System Using Fuzzy Logic," IEEE Transactions on Consumer Electronics, vol. 38, No. 3, pp. 624-634, Aug. 1992.

(Continued)

*Primary Examiner*—Jason Chan
*Assistant Examiner*—Michael Osinski
(74) *Attorney, Agent, or Firm*—Townsend and Townsend and Crew, LLP

(57) ABSTRACT

The present invention discloses a method for acquiring automatic exposure control parameters and a method for controlling automatic exposure control parameters and an imaging device. The core idea is to take the brightness weighted average value obtained according to brightness distribution weighted statistics of the image as the exposure control parameter. Then through adjusting the weighted coefficient of pixels in different brightness regions, control the influence of the pixel concentrated brightness regions on the brightness average value. Because the brightness distribution is the basis for determining weighted statistics, the control method of the present invention is not influenced by the scene assumption. Rather it can be universally adapted to a variety of different scenes, and the exposure control effect is not influenced by the position of scenes in the actual bright region/dark region and block distribution.

4 Claims, 13 Drawing Sheets

U.S. PATENT DOCUMENTS

| | | | | |
|---|---|---|---|---|
| 6,163,621 A * | 12/2000 | Paik et al. | | 382/169 |
| 6,721,000 B1 * | 4/2004 | Lin et al. | | 348/223.1 |
| 7,415,203 B2 * | 8/2008 | Lee | | 396/233 |
| 7,424,148 B2 * | 9/2008 | Goh | | 382/169 |
| 7,508,993 B2 * | 3/2009 | Yuan et al. | | 382/274 |
| 7,525,591 B2 * | 4/2009 | Yasuda | | 348/362 |
| 7,532,359 B2 * | 5/2009 | Yuan et al. | | 358/1.9 |
| 2001/0019364 A1 * | 9/2001 | Kawahara | | 348/362 |
| 2003/0095192 A1 * | 5/2003 | Horiuchi | | 348/222.1 |
| 2005/0057666 A1 * | 3/2005 | Hu et al. | | 348/229.1 |
| 2006/0044459 A1 * | 3/2006 | Kato | | 348/362 |
| 2006/0125952 A1 * | 6/2006 | Kubota | | 348/362 |
| 2006/0268128 A1 * | 11/2006 | Miwa | | 348/234 |
| 2006/0274180 A1 * | 12/2006 | Yasuda | | 348/333.01 |

OTHER PUBLICATIONS

Shimizu, Suji et al., "A New Algorithm for Exposure Control Based on Fuzzy Logic For Video Cameras," IEEE Transactions on Consumer Electronics, vol. 38, No. 3, pp. 617-623, Aug. 1992.

* cited by examiner

METHOD FOR ACQUIRING AND CONTROLLING AUTOMATIC EXPOSURE CONTROL PARAMETERS AND IMAGING DEVICE

CROSS-REFERENCES TO RELATED APPLICATIONS

The present application claims priority to Chinese Patent Application No. 200610079646.9, filed Apr. 30, 2006, commonly assigned, incorporated by reference herein for all purposes.

BACKGROUND OF THE INVENTION

The present invention relates to the digital imaging technology field, in particular, it relates to a method for acquiring/controlling automatic exposure control parameters and an imaging device.

In the process of shooting a video, adequate exposure of a photographing subject is an important condition in order to obtain satisfactory image quality. The existing imaging device commonly adopts two control methods: the manual exposure method and automatic exposure method. With the manual exposure method, adequate amount of exposure is achieved through manual adjustment of the aperture and shutter speed. This method allows a photographer to adjust the amount of exposure according to his, particular aesthetic needs. Thus, this method has been widely used in the area of professional photography and video photography. In contrast, the automatic exposure control method is generally used in everyday non-professional devices such as your common household digital camera, home video camera, etc.

The exposure control for video camera devices using automatic exposure control is designed generally based on "Gray World Assumption"; the average brightness (AY) of the current image is taken as the exposure control parameter, and through adjusting shutter speed, aperture size, and amplifier gain, AY approaches the image average brightness reference value (AYref) that is setup. Taking AY as the exposure control parameter certainly can achieve a more ideal effect for the scenes conforming with "Gray World Assumption"; however, the "special scenes" with a large section of dark area or a large section of bright area are no longer considered as a "Gray World", and taking AY to control automatic exposure will generate phenomena such as the over exposure or under exposure of the photograph subject. For example, in scene 1, a person wearing a yellow outfit is posing for a picture with snow in the background. Because the background and the outfit both have large sections of high brightness areas, which causes AY to become too high, therefore, automatic exposure control carries out substantial adjustment to reduce light flux (shutter speed, aperture size, and amplifier gain, etc.), which leads to serious insufficient exposure of the face of the subject. In scene 2, a person wearing a black outfit is posing for a picture with a brown curtain as the background. This case is completely opposite to Scene 1. The result of taking AY as the exposure control parameters results in significant over exposure of the subject's face.

Toshinobu Haruki and others provided a method for reducing under exposure or over exposure for subjects photographed under "special scenes" in the paper "Video camera system using fuzzy logic" (Toshinobu Haruki, Kenichi kikuchi, AV Development Center, Sanyo Electric Co., Ltd. "Video camera system using fuzzy logic", IEEE Transactions on Consumer Electronics, Vol. 38, No. 3, AUGUST 1992. The main idea of this method is to apply a certain fuzzy control strategy to reduce the weight of the non-subject area in AY computing, based on the position of the proposed photograph subject in the picture, thereby reducing the effect of exposure control on the non-subject image. The typical application scenes used in this technical proposal are head and shoulder shots, and we further assumed that all the photograph subjects were generally located in the middle or the lower portion of the picture. Thus, greater weight was given to these areas. Thus, the computed brightness weight average value (AYw) tends to be located in these areas of interest, thus, taking AYw as the exposure control parameters can more easily obtain normal exposure of the subject positioned in the middle of the picture. The key of this method lies in the design of control rules, which computes and obtains AYw approximating with AY in common scenes; in the special scenes, AYw primarily relies on the areas of interest. The drawbacks of this method are: 1. the corresponding fuzzy logic control rules have to be drawn up according to the prior knowledge of the majority application scenes and typical application environment, and it requires building a scene pattern database inside a camera or a video camera. This implementation procedure is complex; 2. the generated exposure effect is closely associated with the image partition mode and the position of the photograph subject in the picture, this method relies too much on presumption and lacks versatility/universality.

Shuji Shimizu provided a method for reducing under exposure or over exposure for subjects photographed under "special scenes" in the paper "A new algorithm for exposure control based on fuzzy logic for video cameras" (Sony Intelligent System Research Lab, Sony Corporation. "A new algorithm for exposure control based on fuzzy logic for video cameras", IEEE Transactions on Consumer Electronics, Vol. 38, No. 3, AUGUST 1992). The main idea of this method is to acquire two exposure control parameters H_mean and H_diff through image brightness distribution statistics. These two parameters reflect the area ratio of the "bright region" and "dark region" in a picture and the contrast intensity of the "bright region" and "dark region"; exposure control is carried out through these two parameters based on a set group of exposure compensation rules. With this method, H_mean is defined as the ratio of brightness greater than pixels of AY occupying the number of pixels in the entire picture; H_half is the ratio that brightness is greater than ½ of the pixels of AY occupying the number of pixels in the entire picture; H_twice is the ratio that brightness is as twice as great than the pixels of AY proportionate to the number of pixels in the entire picture; H_diff takes the smaller one among (H_twice–H_mean) and (H_mean–H_half). The exposure compensation rules are designed which are primarily sensitive to the latter. The drawbacks of this method are: 1. it merely provided an exposure compensation method for the "special scenes" which faced against light or faced directly into strong light in automatic exposure, and the application scope is comparatively limited; 2. exposure effect depends on the reliability of these two parameters. Reliability experiments carried out on these two parameters have shown the reliability of H_mean is relatively high, however, this parameter is not the dominant factor controlling compensation; the amount of compensation is primarily decided by H_diff. However, this parameter is very sensitive and is affected by a variety of conditions. For example, a complex and layered background has a huge impact to this parameter. Therefore, this method is more effective for clear and simple scenes, and less effective for complicated scenes.

BRIEF SUMMARY OF THE INVENTION

The purpose of the present invention is to provide a method for acquiring and controlling automatic exposure control parameters and an imaging device, which has universal adaptability for a variety of scenes, and where exposure control effect is not influenced by the position of large areas of bright region/dark region in a scene and block distribution.

In order to attain the purpose of the present invention, the deployed technical proposal is, a method for acquiring control parameters in automatic exposure control, includes: 1) compute brightness distribution of the exposure image; 2) partition into different brightness regions according to the brightness distribution; 3) assign corresponding weighted coefficient for different brightness regions; 4) compute the weighted average value of the brightness of the exposure image as the aforementioned control parameter.

Computation of image brightness distribution may adopt the brightness histogram form, which may include: 1a) divide the degree of brightness into a number of bins; and 1b) compute distribution of the pixels in the exposure image in each bin. Partitioning of the corresponding brightness regions may adopt: 2a) partition regions with a specific width, focusing on the bins with peak values, and at least partition a highest peak region and a second highest peak region in the entire brightness distribution.

Computation of the image brightness distribution also may adopt the moving average and moving accumulation histogram form. That is, after acquiring a brightness histogram, use moving windows with the prescribed width to compute the moving average and moving accumulation of the pixel distribution in each bin; the brightness region partitioning steps at this time include: 2a) partition each peak region of the pixel distribution in each bin corresponding to the brightness region, based on moving computing peak value, at least partition a highest peak region and a second highest peak region in the entire brightness distribution.

Preferably, the brightness region partitioning steps also include: 2b) judge whether the highest peak region overlaps with the second highest peak region; if they overlap, then, the third highest peak region is taken as the second highest region, and so on and so forth, until the aforementioned highest peak region and the second highest peak region are no longer overlapping.

The weighting strategy for different brightness regions may adopt assignment of weighted coefficient for pixels of the peak region smaller than that of the other regions.

Preferably, the aforementioned weighting strategy should be as follows: the assignment of weighted coefficient of the peak value region decreases along with the increase of pixel distribution in the peak value region, and after decreasing to the smallest weighted coefficient, maintain steady or increase, or increase after maintaining steady in the specific region.

Even more preferable, the corresponding smallest weighted coefficient of the peak regions with higher brightness of the aforementioned highest peak region and the second highest peak region increases along with the increase of the current relative photoelectric gain, and the corresponding smallest weighted coefficient of lower brightness peak value region decreases with increase of the current relative photoelectric gain.

The present invention also provides a method for controlling control parameters in automatic exposure control, including: 1) adopt the aforementioned control parameter acquisition method to acquire the brightness weighted average value of the current exposure image; 2) compare the aforementioned brightness weighted average value with the brightness reference value; 3) perform relative photoelectric gain adjustment based on the comparison results; the exposure image brightness weighted average value after adjustment is close to the brightness reference value.

Preferably, the aforementioned brightness reference value adopts the dynamic adjustment method that increases along with the increase of the ratio value of the current brightness weighted average value with the relative photoelectric gain.

Preferably, set up a proper threshold, a buffer threshold, and a rapid change threshold in the gradual expansion range focusing on the aforementioned brightness reference value; when the aforementioned brightness weighted average value falls into the proper threshold, or the property threshold enters the buffer threshold and changes in the buffer threshold, no relative photoelectric gain adjustment is performed; when it oversteps the buffer threshold but still falls into the rapid change threshold, adjust the relative photoelectric gain with smaller step length, so that the aforementioned brightness weighted average value returns within the proper threshold; when it oversteps the rapid change threshold, adjust the relative photoelectric gain with large step length, so that the aforementioned brightness weighted average value returns within the rapid change threshold.

Preferably, the following strategies are adopted when adjusting relative photoelectric gain: adjust shutter time as the first priority, if the adjustment requirement has not reached, continuously adjust the aperture, and finally adjust the amplifier gain; or, adjust the aperture as the first priority, the shutter time as the second priority, and the amplifier gain as the last priority; or, set one or two parameters types as constant values, but only adjust other parameters.

The present invention also provides a type of imaging device, including a photosensitive device, an aperture, a shutter, an amplifier, a relative photoelectric gain adjustment module, an image processing module, a brightness distribution computing module, a weight computing module, and a compensation control module; the aforementioned photosensitive device converts light passing through the aperture and the shutter into analog current signals; the aforementioned amplifier amplifies the output from the photosensitive device; the aforementioned image processing module converts the output of the aforementioned amplifier into digital image signals; the aforementioned brightness distribution computing module computes the brightness distribution of the digital image signals; the aforementioned weight computing module distributes the corresponding weighted coefficient for different brightness regions based on the aforementioned brightness distribution computing module computing results, and computes the brightness weighted average value of the aforementioned digital image signals; the aforementioned compensation control module decides the adjustment target of the relative photoelectric gain based on the difference between the aforementioned brightness weighted average value and the brightness reference value; the aforementioned relative photoelectric gain adjustment module decides the relative photoelectric gain adjustment target based on the aforementioned compensation control module, and carries out the corresponding adjustment of the aperture size and/or shutter time and/or amplifier gain.

By adopting the aforementioned technical proposal, the beneficial technical effects of the present invention are:

The present invention deploys a method of taking AYw, which is acquired by weighted statistics of the brightness distribution, as the exposure control parameters, which is capable of adjusting the weight based on the pixel concentration conditions in different brightness regions of the image, thus controlling the pixels concentrated brightness region, e.g., the influence the large area of a bright region or the large area of a dark region exerts upon the brightness average value. Because the brightness distribution is the basis for determining weighted statistics, the control method of the present invention is not influenced by the scene assumption, Rather it can be universally adapted to a variety of different scenes, and the exposure control effect is not influenced by the position of scenes in the actual bright region/dark region and block distribution The present invention also provides various preferable weighted strategies and exposure control strategies obtained via extensive computation and experimentation, which lead to the possibility of obtaining a satisfactory automatic exposure control result by adopting the control method of the present invention and the imaging device utilizing the control method of the present invention

BRIEF DESCRIPTION OF THE DRAWINGS

The present invention is described in further detail through embodiments and in conjunction with the appended drawings.

DETAILED DESCRIPTION OF THE INVENTION

Embodiments for Implementation

The present invention provides a method for acquiring and controlling automatic exposure control parameters and an imaging device utilizing this control method. The central idea of the present invention is to take AYw, which is acquired according to weighted statistics of the image brightness distribution as the exposure control parameter, and, through adjusting the weighted coefficient of the pixels of different brightness regions, control the influence of the pixel concentrated brightness region on the brightness average value. Computation of the image brightness distribution may adopt the brightness histogram, moving average histogram, and moving accumulation histogram, etc. forms.

The present invention also provides a preferred brightness region partitioning mode and various preferred weighted strategies, minimum weighted coefficient control strategy, brightness reference value adjustment strategy, and relative photoelectric gain adjustment strategy, etc. The method of acquiring automatic exposure control parameters, the method of controlling automatic exposure, and the imaging device of the present invention are described in detail below.

Figure 1:
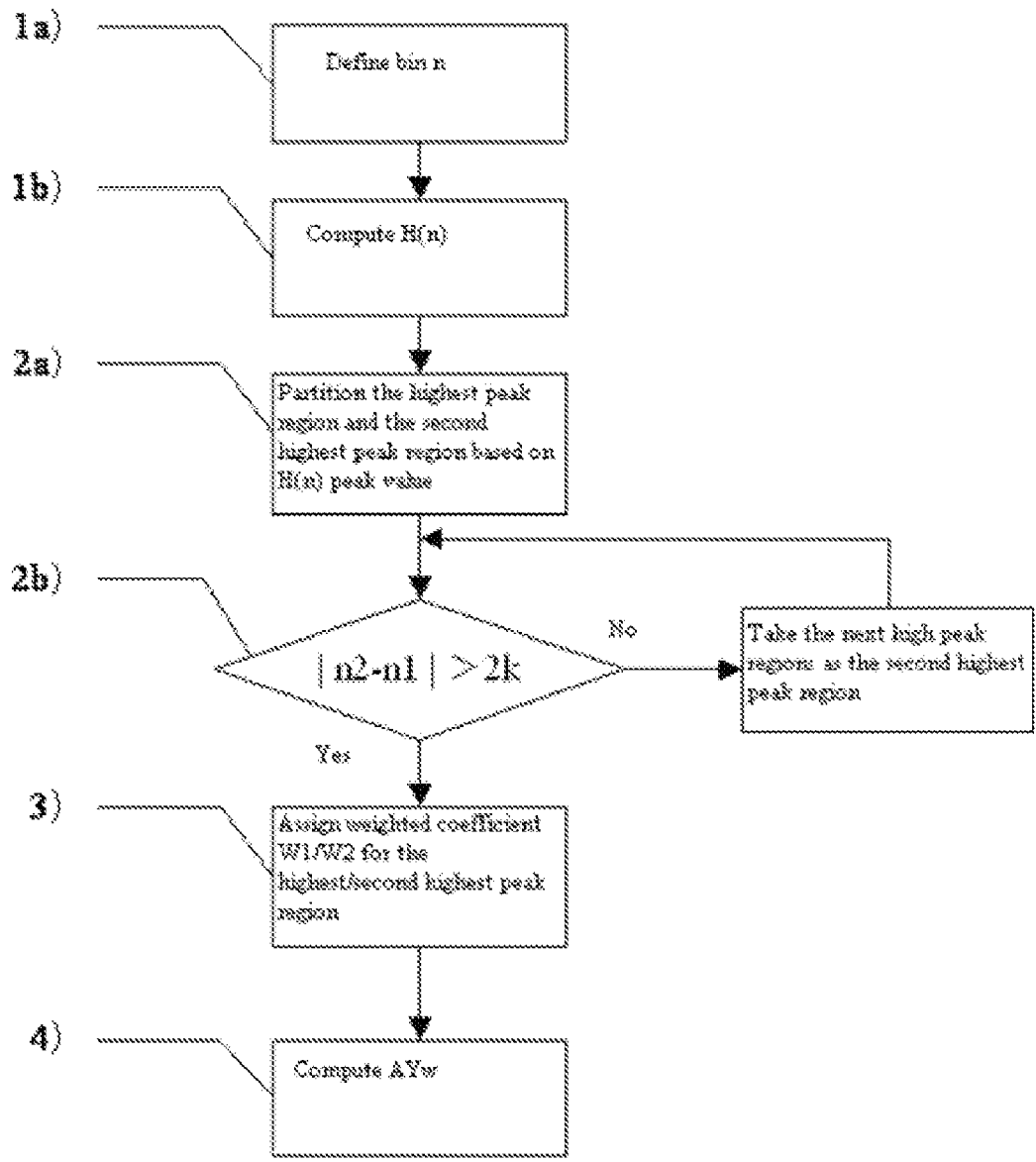
FIG. 1 is a schematic drawing showing the control parameter acquisition flow in Application Example 1.

Application Example 1, a method of acquiring automatic exposure control parameters, as its flow shown in FIG. 1, includes:

Compute brightness distribution of the exposure image; in this example, brightness distribution of the exposure image is computed by using a brightness histogram, including, 1a) Divide the brightness levels into a number of bins (Bin);

To facilitate the digitalization process, brightness of each pixel in the picture will be quantified first. Preciseness of the degree of quantification depends on the level of the brightness. For example, after quantifying using 8 bits (bit), the image may have 0~255 brightness levels, for a total of 256 brightness levels; after quantifying using 4 bits (bit), the image may have 0~15 brightness levels, for a total of 256 brightness levels, and commonly the higher brightness level indicates a greater brightness. After quantifying the brightness, one or a consecutive number of brightness levels are defined as bins, and each bin is labeled with a bin number n. Commonly, the number of brightness levels contained in each bin is uniform. That is, all brightness levels are evenly distributed to a number of bins. For example, when 8 bit quantification uses 256 bins, n=0~255, namely, each bin contains one brightness level, and the bin number is the code for the corresponding brightness level. In another example, when 8 bit quantification uses 64 bins, n=0~63, each bin contains 4 brightness levels, and n bin corresponding code is 4n~4n+3 brightness levels. Of cause, it is also acceptable to define different number of brightness levels for each bin on an as needed basis. This example uses the brightness level uniform distribution type.

1b) Compute pixel distribution of the exposure image in each bin, that is, compute the brightness histogram of the image H(n). H(n) may use the corresponding number of pixels of the brightness level containing in n bin, and it may also use the ratio of total pixels of the corresponding pixel number occupying the entire image. There is no substantial difference between both methods, and the former is used in this example.

The different brightness regions are partitioned based on H(n) indicating image brightness distribution situation; including 2a) The regions with k width are partitioned as the brightness regions of this peak value make the highest peak value H(n1) and the second highest peak value H(n2) the central focus, respectively, and it obtains the highest peak region H(n1−k)~H(n1+k) and the second highest peak region H(n2−k)~H(n2+k).

2b) Judge whether the highest peak region and the second highest peak region are overlapping, that is, whether it satisfies |n2−n1|>2k. If it does not satisfy, this means the highest peak region and the second highest peak region are overlapping, then the third highest peak region is taken as the second peak region, and so on and so forth, until the second highest peak region and the highest peak region are no longer overlapping. The purpose of overlapping judgment is to avoid the event of lacking accurate judgment in the overlapping regions at the time of carrying out weighted coefficient; meanwhile, it also avoids repeating weight control for brightness approximation regions, as that affects control results.

Partitioning of the highest peak region and the second highest peak region based on H(n) is described using two concrete case examples below. Case 1 is as shown in FIG. 2.

Figure 2:
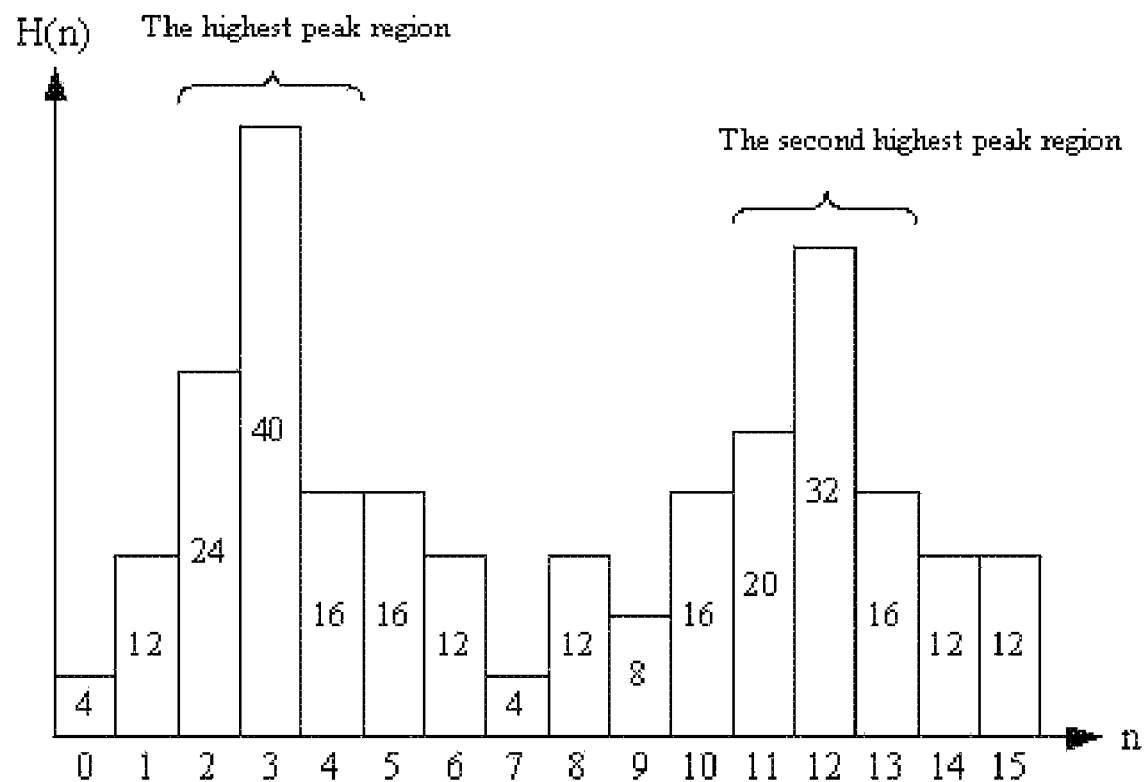
FIG. 2 is a schematic drawing showing partitioning of peak value regions based on cartogram H(n) in case 1 of Application Example 1.

FIG. 2 is a H(n) cartogram of 4 bit quantification using 16 bins, n=0~15, the image size to be computed is 16×16, with 256 pixel dots in total, and the corresponding pixel number for each bin is labeled in histogram. Acquire the highest peak for H(n), which is H(3), the second highest peak is H(12) based on the statistical results, take width k=1, and obtain the highest peak region of H(2)~H(4), the second highest peak region of H(11)~H(13), obviously both peak regions are not overlapping, and the partitioning is complete.

Figure 3:
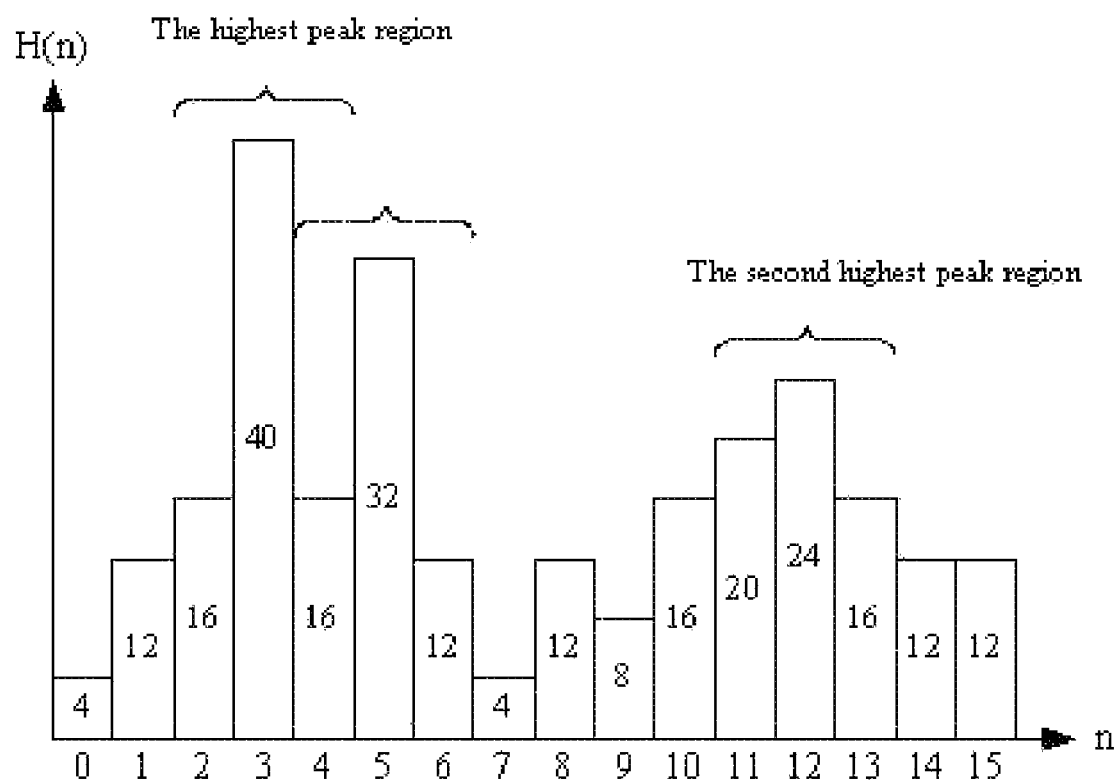
FIG. 3 is a schematic drawing showing partitioning of peak value regions based on cartogram H(n) in case 2 of Application Example 1.

Example 2 is as shown in FIG. 3. The definition of each fundamental item in FIG. 3 is similar to FIG. 2. Acquire the highest peak for H(n), which is H(3), the second highest peak is H(5) based on the statistical results, take width k=1, because n2-n1=2k, this means that there is an occurrence of bin overlapping among two peak value regions, as shown by broken line brackets in FIG. 3. Therefore, take the third highest peak H(12) as the second highest peak, and judge whether the highest peak region and the second highest peak region are not overlapping again, obtain the highest peak region as H(2)~H(4), and the second highest peak region as H(11)~H(13), and the partitioning is complete.

In the process of partitioning the peak regions, the corresponding rules may be prescribed for some special scenarios based on the actual application. For example, when the bin where the peak value is located is positioned at the edge of the cartogram, the width designed for the number of bins at the left side or the right side is insufficient, and it is acceptable to define the range of the peak region to a consecutive 2k+1 bin near the edge (at this time, the bin number of the peak is no longer the central bin number of that region); in another example, when two neighboring bins have the same peak value, it is acceptable to define the one with greater distance from the center of another peak region as the center bin of that peak region; again, if two peak regions have the same center peak value, it is acceptable to define by randomly selecting one and label it as the highest peak region, and label the other as the second highest peak.

Figure 4:
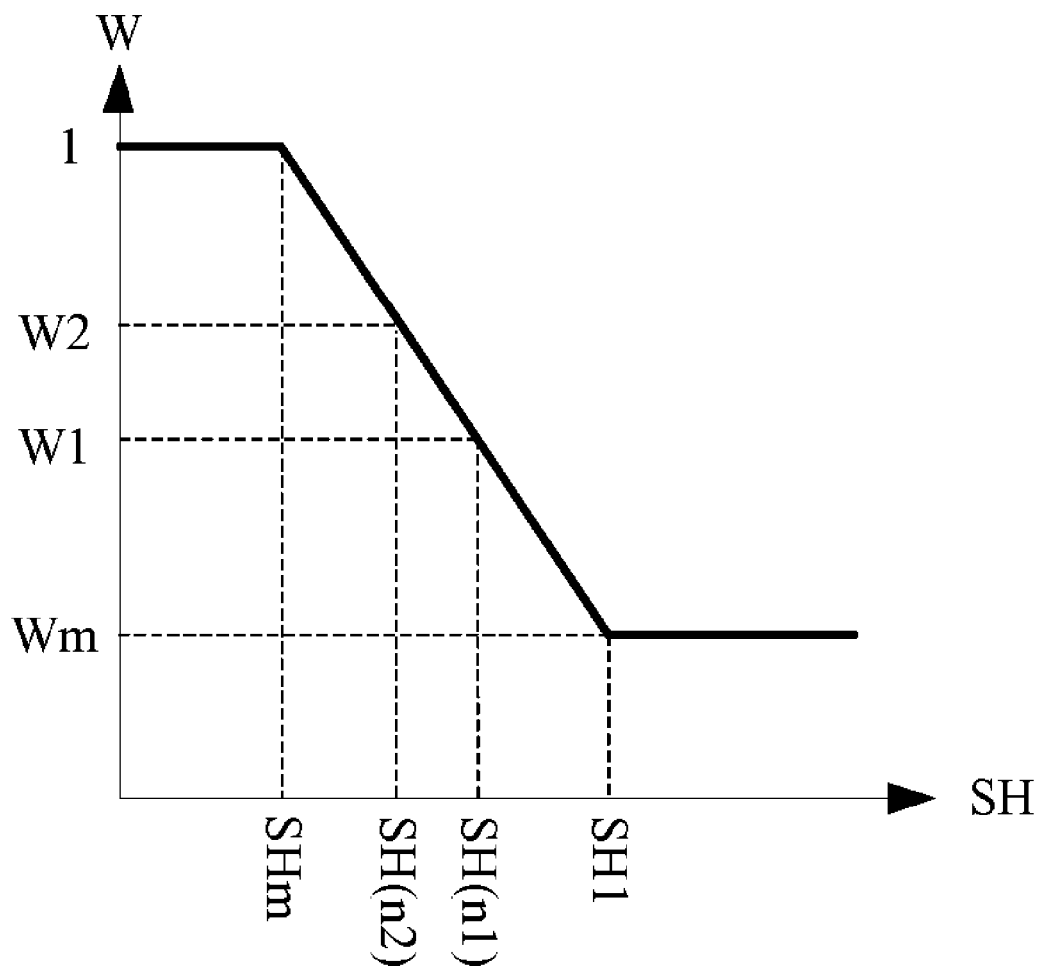
FIG. 4 is a schematic drawing showing a settlement curve for deciding the weighted coefficient in Application Example 1.

3) Assign the corresponding weighted coefficient to the different brightness regions; in order to reduce the influence of the pixel brightness distribution concentrated regions caused by large areas of bright region/dark region in the image, and compute the brightness average value. In short, the weighting strategy may use the method in which the pixel distribution of the peak region has smaller weighted coefficient than other regions. In this Application Example, as shown in FIG. 4, the settlement curve is used to distribute the peak region weighted coefficient, and the weighted coefficient of other regions is 1. In FIG. 4, W is a weighted coefficient, SH is the accumulated pixel number of the peak region, SHm is the minimum accumulated pixel number using weighted control, SH1 is the accumulated pixel number entering the minimum weighted control region, SH(n1) is the accumulated pixel number of the highest peak region, SH(n2) is the accumulated pixel number of the second highest peak region (the positions of SH1 and SH2 are schematic in FIG. 4, but this does not indicate SH1 is greater than SH2), Wm is the minimum weighted coefficient, W1 and W2 are the corresponding weighted coefficient of the highest peak region and the second highest peak region, respectively. As it can be seen through FIG. 4 that the settlement curve weighting strategy assigns different weighted coefficient for the peak region with the different accumulated pixel number. When the accumulated pixel number of the peak region is greater than SHm, the weighted coefficient decreases with the increase pixel distribution in the peak region, and when the accumulated pixel number of the peak region is greater than SH1, the weighted coefficient retains the minimum weighted coefficient Wm. Of course, W1 and W2 also may be decided by using the average accumulated pixel number AH of the corresponding peak region, AH=SH/(2k+1); it is essentially identical.

4) Compute the brightness weighted average value AYw of the exposure image as the control parameter for automatic exposure control. The method for carrying out weighted computation is for accumulating and averaging the brightness value of each pixel according to the weighted coefficient, as shown in the following formula:

$$AY_w = [\Sigma n * H(n) * W(n)] / [\Sigma H(n) * W(n)]$$

A simple and typical partitioning strategy are used in this following example. H(n) is partitioned into three regions: the highest peak region, the second highest peak region, and the other regions. Based on the partitioning idea and method described in this example, more detailed region partitioning of the image can also be performed based on the actual application needs. At the same time, it is also acceptable to partition only the partial brightness distribution region of the image, and the number of sections of the actual region partition and the wholeness of the image brightness distribution coverage are not restricted by the present invention.

Figure 5:
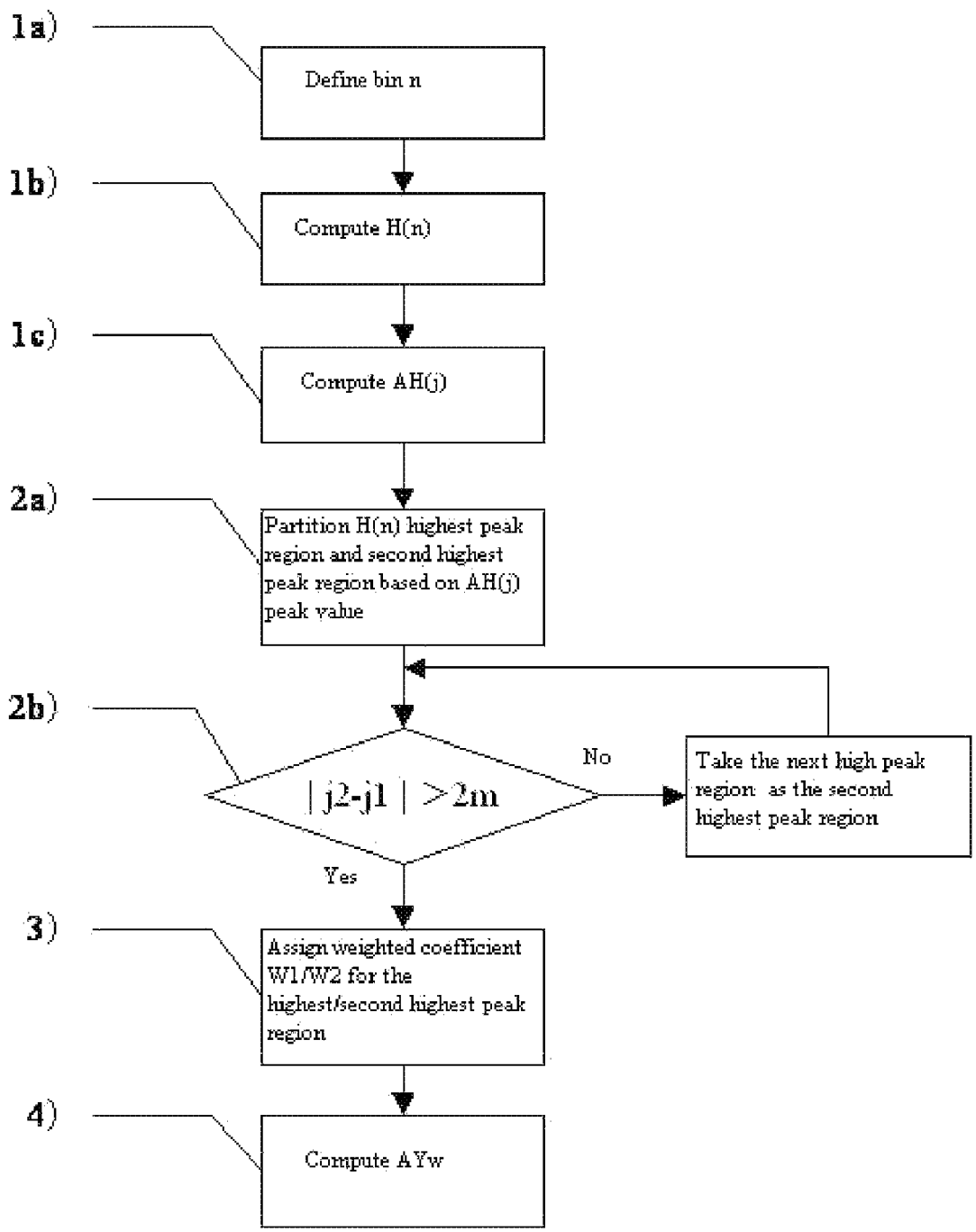
FIG. 5 is a schematic drawing showing the control parameter acquisition method flow in Application Example 2.

Application Example 2, a method for acquiring control parameters for automatic exposure control, as shown in the flowchart in FIG. 5, is fundamentally similar with Application Example 1, and the difference lies at the moving average histogram AH(j), which is used to compute brightness distribution of the exposure image in step 1). Therefore, in this Application Example, after acquiring brightness histogram (H(n) of the image, it also adds the following:

1c) Moving average computation is performed using the moving window with a width of 2m+1 to pixel distributed in each bin, and the moving average histogram AH(j) of the image is acquired;

$$AH(j) = \frac{\left[\sum_{n=j-m}^{n=j+m} H(n)\right]}{(2m+1)}$$

As can be seen from the above formula, one AH(j) corresponds to one H(n) interval: H(j−m)~H(j+m).

Therefore, in step 2a), each peak region is partitioned based on the corresponding brightness region H(n) of AH(j) peak value, instead of deciding the peak interval based on H(n) peak value. This Application Example also deploys the partitioning method of the highest peak region, the second highest peak region, and other regions. Obviously, the corresponding j code of AH(j) peak is the central bin number of the corresponding H(n) peak interval. Therefore, it is also acceptable to use the method in the Application Example 1 to judge whether the peak intervals are overlapping, but the central bin numbers n1 and n2 of the highest peak region and the second highest peak region can only be substituted by the highest and the second highest peak codes j1 and j2.

Figure 6:
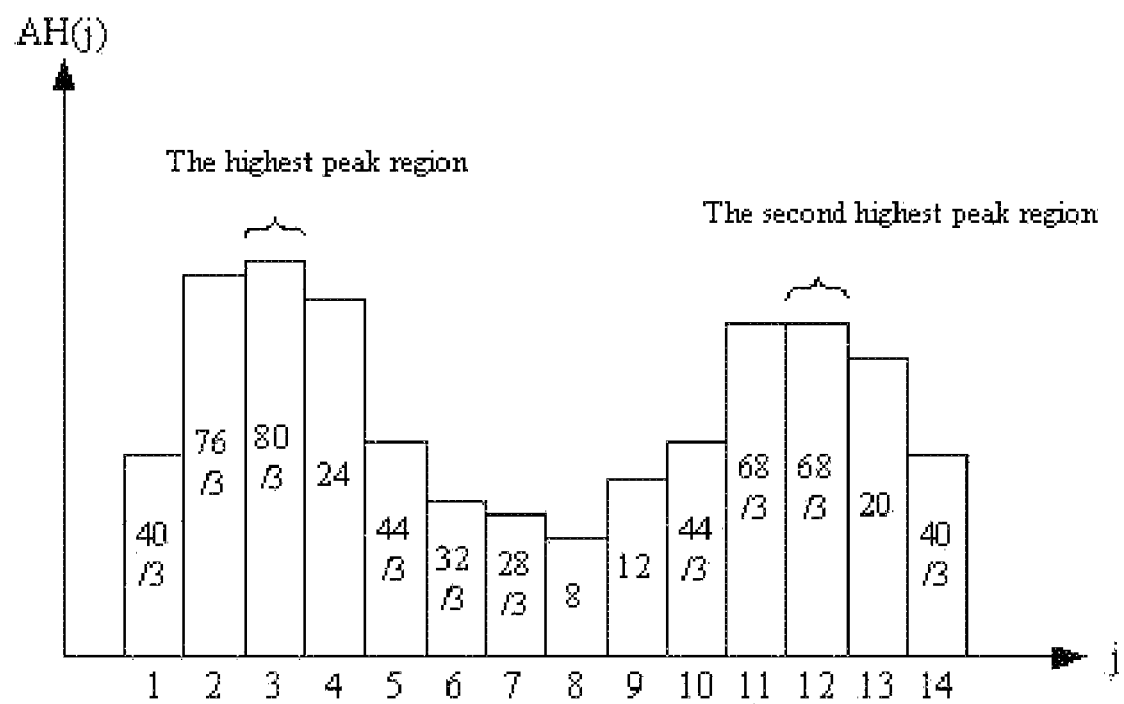
FIG. 6 is a schematic drawing showing partitioning of peak value regions based on AH(j) cartogram in case 1 of Application Example 2.

Two concrete examples are given for describing the highest peak region and the second highest peak region partitioning based on AH(j). Case 1 is based on FIG. 2 in the Application Example 1. Taking m=1 moving window to perform moving average computation of H(n) cartogram in FIG. 2, acquire AH(j) cartogram, j=1~14, as shown in FIG. 6; AH(j) value is labeled in the diagram. Acquire the highest peak as AH(3), the second highest peak as AH(12) for AH(j) based on the statistical results (AH(11) neighboring with AH(12) has the same second highest peak value, it is acceptable to prescribe that another second highest peak with greater distance with another peak is selected). Therefore, the corresponding highest peak region of H(n) is H(2)~H(4), and the second highest peak region is H(11)~H(13). j2−j1>2m, both peak regions do not overlap, and the partition is complete.

Figure 7:
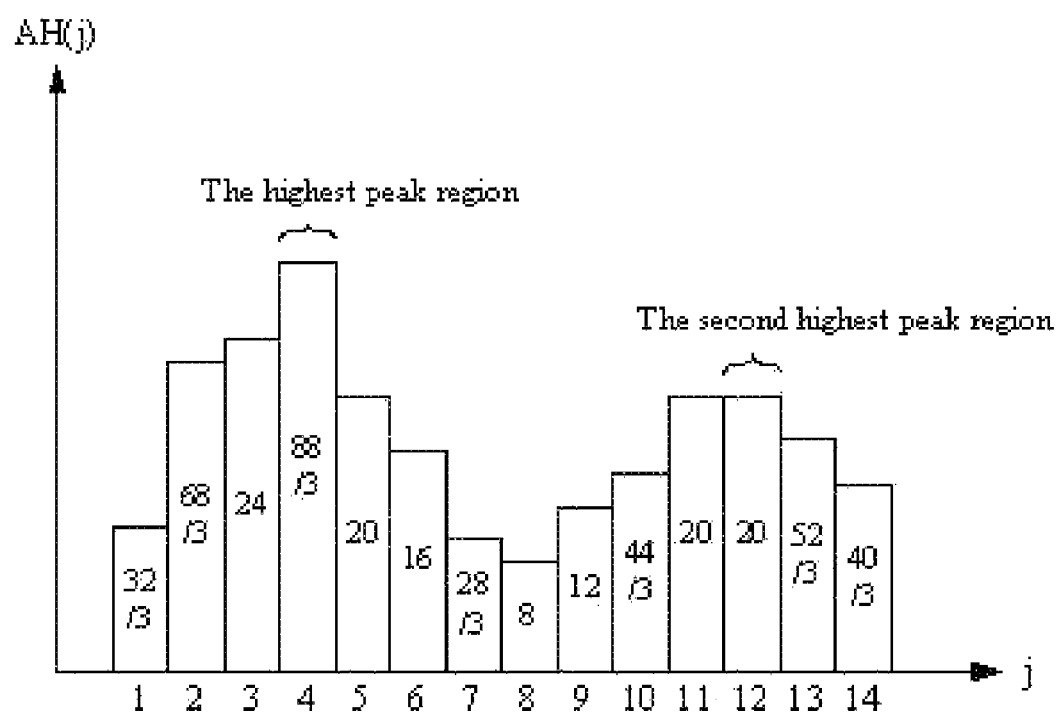
FIG. 7 is a schematic drawing showing partitioning of peak value regions based on AH(j) cartogram in case 2 of Application Example 2.

Case 2 is based on FIG. 3 in the Application Example 1. Taking m=1 moving window to perform moving average computation of H(n) cartogram in FIG. 3, acquire AH(j) cartogram, j=1~14, as shown in FIG. 7, label AH(j) value in the diagram. Acquire the highest peak as AH(4), the second highest peak as AH(12) for AH(j) based on the statistical results. Therefore, the corresponding highest peak region H(n) is H(3)~H(5), and the second highest peak region is H(11)~H(13). j2−j1>2m, both peak regions do not overlap, and partition is complete.

Compare with partitioning processes and results of Application Example 1 and case 1 and case 2 in this Application Example, it is clear that the fundamentals for partitioning the final highest/second highest peak regions obtained with these two statistical methods are close; the statistical method in this example yields relatively better results. Under the same brightness grade level span, the highest peak region H(3)~H(5) in case 2 of this Application Example contains more pixel dots compared with the highest peak region H(2)~H(4) in case 2 of the Application Example 1, which better reflects the characteristics of pixel concentrated distribution in that brightness region; based on using AH(j) statistical results for peak region partitioning, the probability of peak region overlapping is clearly reduced. Therefore, it is more preferable to adopt AH(j) statistics for brightness distribution of the image. Of course, it is also acceptable to use a moving accumulation histogram SH(j) to substitute AH(j), SH(j)=AH(j)*(2m+1). Both methods are essentially similar, with the exception of their different absolute values.

Figure 8:
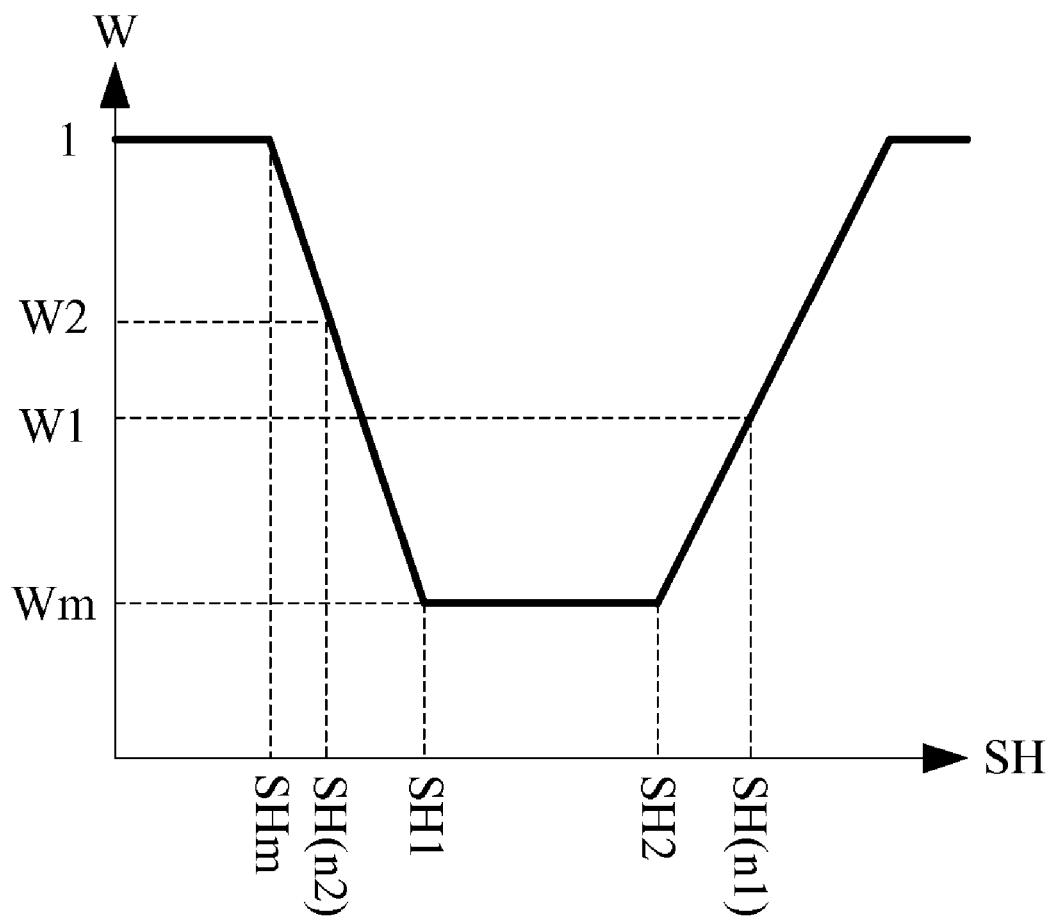
FIG. 8 is a schematic drawing showing a reversed step type curve for deciding the weighted coefficient in Application Example 3.

Application Example 3, a method for acquiring control parameters for automatic exposure control, shares a similar flow with Application Example 2. The area where they differ lies in step 3), when assigning the weighted coefficient corresponding to the different brightness region, the weighted strategy for the peak region adopts a reversed ladder type curve as shown in FIG. 8, and the weighted coefficient in other regions is still 1. The meaning of W, SH, SHm, SH1, SH(n1), SH(n2), Wm, W1, and W2 in FIG. 8 is identical with FIG. 4, and the added SH2 is the minimum accumulated pixel number entering the weighted recovery region. As can be seen through FIG. 8, the reversed ladder type curve weighted strategy is similar with the settlement curve in SH<SH2 region. When the accumulated pixel number of the peak region is greater than SH2, the weighted coefficient starts to recover from the minimum weighted coefficient Wm (the maximum no more than 1).

The reversed ladder type curve actually is a supplement and perfection of the settlement curve, and it is an added segment of weight recovery region of the settlement curve under the condition when the peak region coverage pixel increases to a certain value. The advantage of doing it this way is so one can avoid the phenomenon where the settlement curve may demonstrate AYw scattering in certain actual situations. Because if the peak region concentrates a considerable pixel distribution quantity, the controlling mode which maintains low weight through the whole time may result in AYw that is not a correct reflection of the image in the exposure condition, and which will result in AYw scattering after automatic control adjustment.

Figure 9:
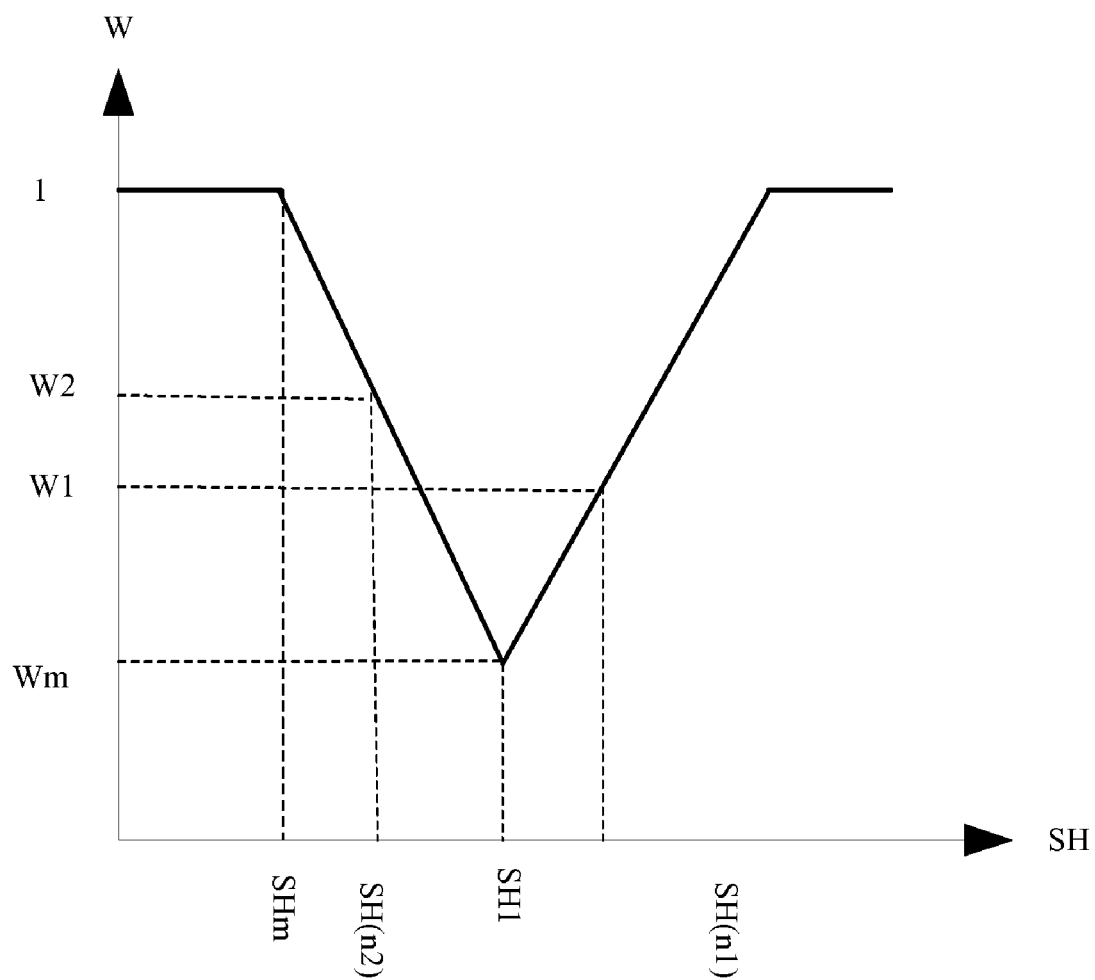
FIG. 9 is a schematic drawing showing a V-type curve for deciding the weighted coefficient.

Similarly, the V type curve weighted strategy as shown in FIG. 9 may be selected. In FIG. 9, the meaning for each parameter is identical with that of FIG. 8, but the segment stabilized as the minimum weighted coefficient Wm between SH1 and SH2 in the reversed ladder curve is reduced to a dot. In brief, the relative change trends for the weighted coefficient and accumulated pixel are all expressed by a linear relationship, and the different weighted curve line type can be selected according to the actual needs, which should not constitute a restriction in the present invention.

Application Example 4 is a method for acquiring control parameters of automatic exposure control. The method in this Application Example is fundamentally similar with the Application Example 3, but there are still differences, such as the minimum weighted coefficient Wm in the weighted strategy curve is adjusted based on the current relative photoelectric gain Gr, and peak regions of different brightness adopt a different adjustment strategy; the minimum weighted coefficient Wmh of the peak region with higher brightness (that is the peak region corresponding to the larger value in n1 and n2, and hereinafter it is called bright peak for short) increases along with the increase of the current relative photoelectric gain, and the minimum weighted coefficient Wmd of the peak region with lower brightness (that is the peak region corresponding to the smaller value in n1 and n2, and hereinafter it is called dark peak for short) decreases along with the increase of the current relative photoelectric gain. Gr=(1/Fn)(Ts/Tf) Ga, where Fn is the number of aperture, Ts is the shutter time, Tf is the reference shutter time, and Ga is the amplifier gain.

Figure 10:
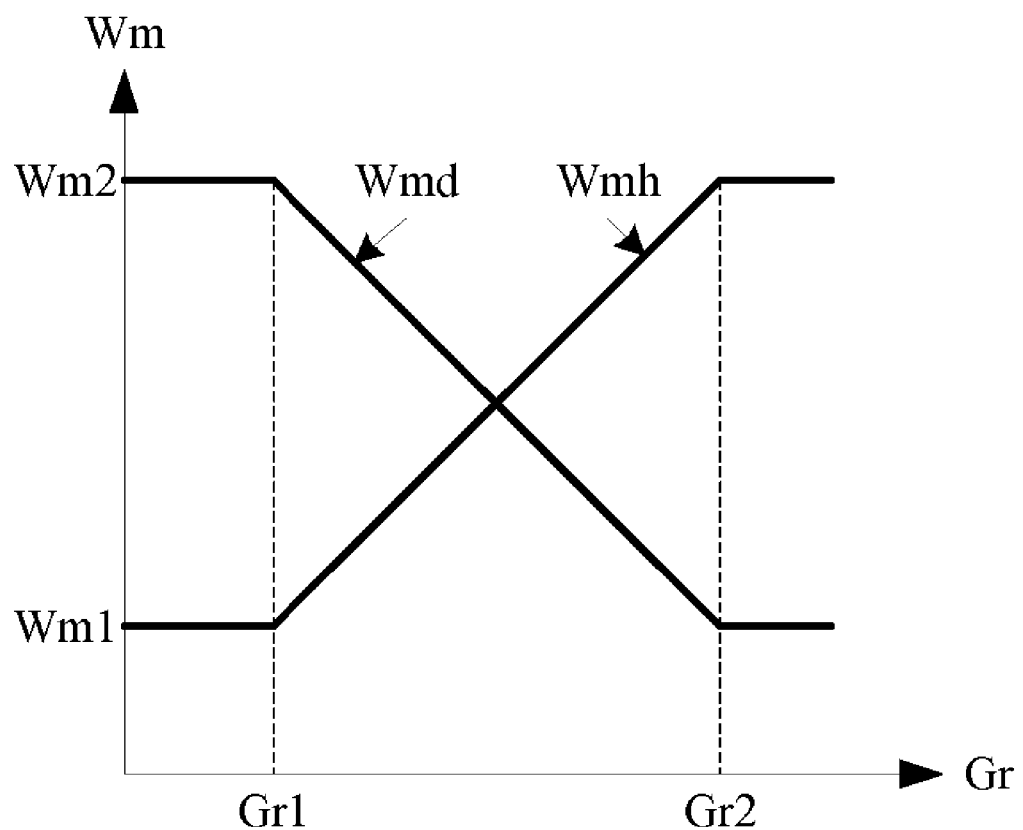
FIG. 10 is a schematic drawing showing Wm dynamic adjustment in application Example 4.

The simple linear relationship between Wm and Gr is used as an example for describing the aforementioned Wm adjustment strategy as shown in FIG. 10. In FIG. 10, the minimum weighted coefficient of the bright peak and dark peak Wmh and Wmd change between the minimum value Wm1 and the maximum value Wm2. Gr1 and Gr2 are Gr threshold values entering and exiting the Wm adjusting region. If currently Gr<Gr1, then the minimum weighted coefficient of the bright peak Wmh remains the minimum value Wm1, and the minimum weighted coefficient of the dark peak Wmd remains the maximum value Wm2; if currently Gr1<Gr<Gr2, that is when it is located at Wm adjustment region, then Wmh increases from Wm1 to Wm2 along with the increase of Gr, and Wmd decreases from Wm2 to Wm1 along with the increase of Gr; if currently Gr>Gr2, then Wmh remains the maximum value Wm2, and Wmd remains the minimum value Wm1.

The advantage of dynamic adjustment of Wm based on Gr change is that the dark peak corresponding weighted ratio can be adequately increased and the weighted ratio of the corresponding bright peak can be relatively decreased when Gr is relatively small (that is, when the degree of exposure is comparatively weak), and when Gr is relatively large (that is, when the degree of exposure is comparatively strong), adequately increase the bright peak corresponding weighted ratio and relatively decrease the corresponding weighted ratio of dark peak. Thus, as a general trend, the weighted coefficient distribution will correspond with the actual exposure condition to achieve better control effects.

Figure 11:
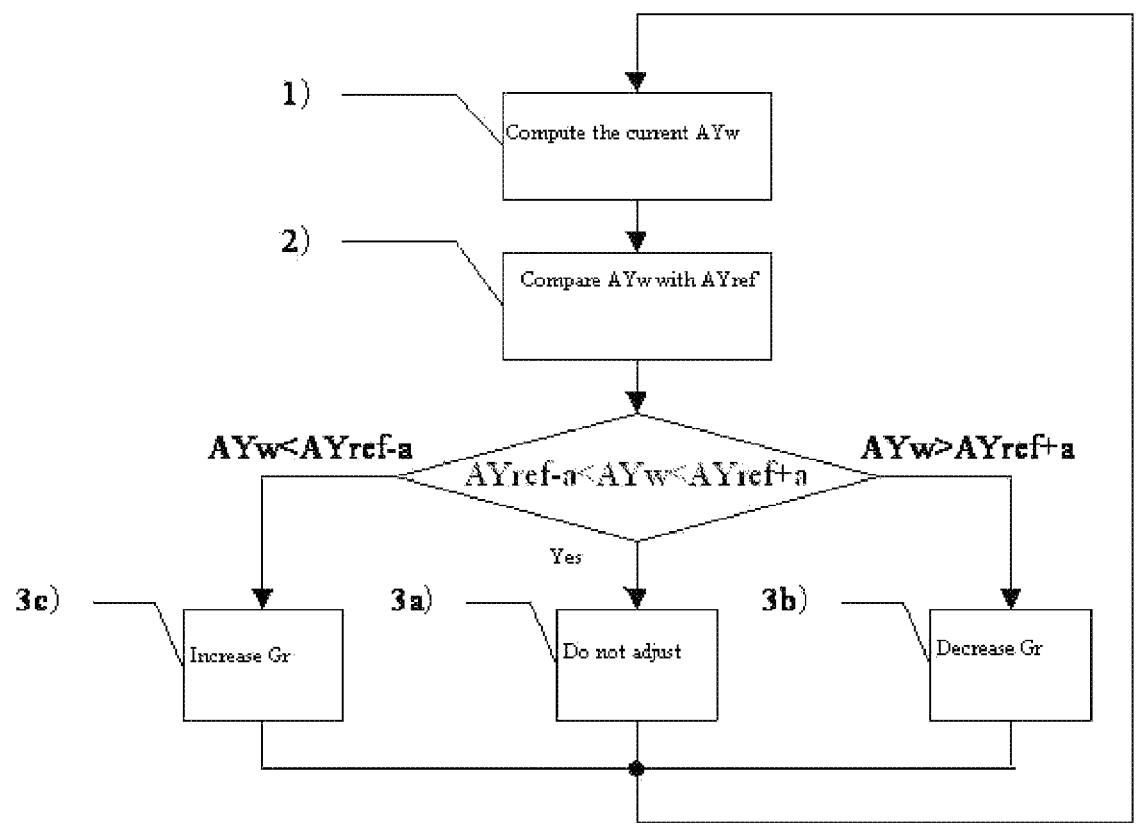
FIG. 11 is a schematic drawing showing the automatic exposure control method in application Example 5.

Application Example 5 is a method of controlling automatic exposure, as shown in the flowchart in FIG. 11, includes Acquire the brightness weighted average value AYw of the current exposure image;

Compare the present AYw with the brightness reference value AYref,

Perform relative photoelectric gain adjustment based on the comparison results, including 3a) When AYw changes in an interval near AYref, suppose it is ±a (hereinafter called adequate threshold), which is regarded as the present degree of exposure is appropriate, and no adjustment will be performed;

3b) If AYw is higher than AYref+a, then it is regarded as over exposure; it therefore needs to be adjusted to reduce Gr, e.g., reducing the aperture, shortening the shutter time, and lowering the amplifier gain, etc;

3c) If AYw is lower than AYref−a, then it is regarded as under exposure, and needs to be adjusted to increase Gr, e.g., increasing the aperture, prolonging the shutter time, and raising the amplifier gain, etc.

In order to allow AYw positioning in a proper state, the aforementioned control procedure may need to be repeated many times. Also, the present exposure scene may change constantly, therefore, execution of the aforementioned procedure needs to be circulated; Gr adjustment needs to be performed repeatedly based on the current exposure condition.

Also, during Gr adjustment, because a broad range of parameters can be adjusted, including the aperture number Fn, the shutter time Ts, the amplifier gain Ga, etc., adjustment strategies with different emphases can be adopted according to the actual equipment conditions (the parameter that is easiest, most accurate, and has the broadest dynamic range for making adjustment for that particular equipment). For example: it is acceptable to adjust Ts as top priority; if adjusting Ts alone is unable to reach the Gr adjustment requirement, then continuously adjust Fn, and perform Ga fine-tuning the last; or it is also acceptable to adjust Fn as top priority, Ts as second priority, and Ga as last priority; or, it is acceptable to make one or two parameter types of s constant, and only adjust other parameters, for example, Fn is unchanged, and only Ts and Ga are adjusted.

Application Example 6, a method for controlling automatic exposure, shares a similar flow with Application Example 5. It is differentiated by the fact that the brightness reference value AYref used in this case is not a constant value, and can be dynamically adjusted based on the current AYw/Gr value. The adjustment strategy is: AYref increases along with the increase of AYw/Gr, that is, a larger AYref is suitable for bright scenes, and a smaller AYref is suitable for dark scenes. The benefit of adopting dynamic AYref is that the exposure control standard can be adequately adjusted automatically according to conditions of the actual scene, to obtain more a natural and realistic exposure effect.

Application Example 7, a method for controlling automatic exposure is fundamentally similar to Application Example 5. It is differentiated by the fact that this application example sets up a finer exposure adjustment range, includes setting a proper threshold ±a in Application Example 5, and uses a different Gr adjustment strategy for different ranges. An exposure adjustment range including a buffer threshold ±b and rapid change threshold ±c is added in this Application Example. The corresponding Gr adjustment strategy is:

AYw falls into AYref±a, or when AYref±a enters into AYref±b and changes within AYref±b, no Gr adjustment will be performed;

When AYw exceeds AYref±b but still falls into AYref±c, perform Gr adjustment in small step length, so that AYw gradually returns within AYref±a;

When AYw exceeds AYref±c, perform Gr adjustment in large step length, so that AYw returns within AYref±c quickly.

Figure 12:
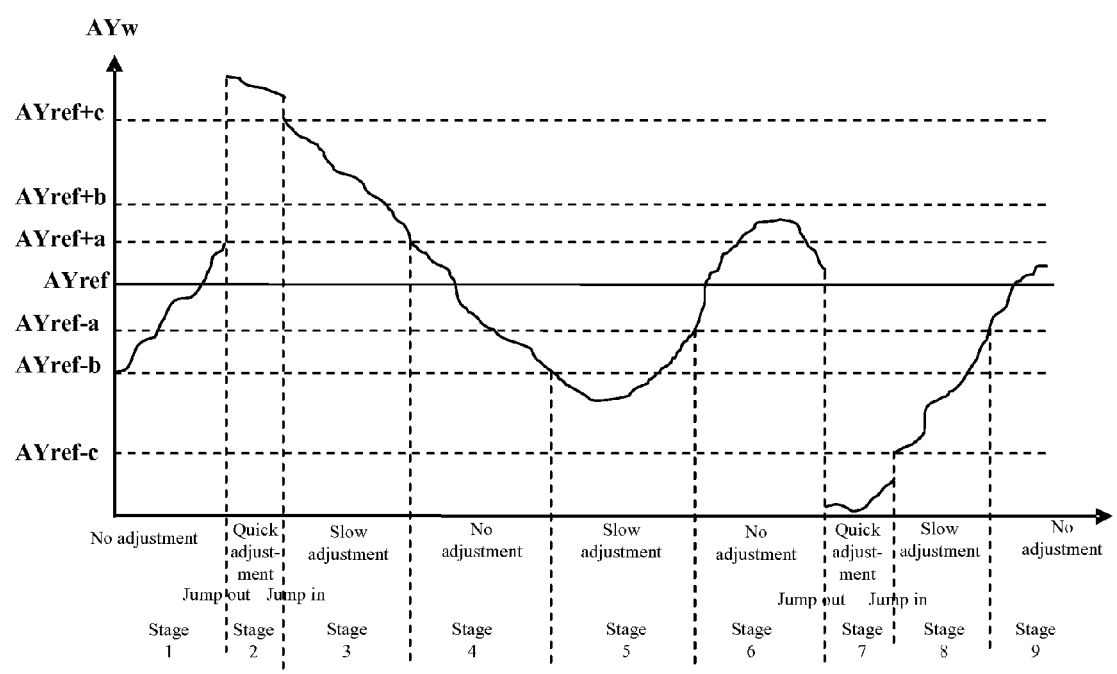
FIG. 12 is a schematic drawing showing Gr adjustment strategy in Application Example 7.

FIG. 12 shows an example of adjusting Gr within a period of time adopting the aforementioned adjustment strategy. FIG. 12 is illustrated in the following stages. Stage 1: AYw falls into AYref±a, do not adjust; stage 2: AYw changes suddenly (it could be triggered by conditions such as turning on/off lights, sudden change of scenes), jump out of AYref+c, perform quick adjustment of Gr with large step length; stage 3: AYw changes suddenly, jump into AYref±c, slowly adjust Gr with small step length to AYref±a; stage 4: AYw changes from AYref±a to AYref−b, do not adjust; stage 5: AYw exceeds AYref−b but still falls in AYref±c, slowly adjust Gr with small step length to AYref±a stage 6: AYw enters into AYref±b from AYref±a, and it is still changes within AYref±b, do not adjust; stage 7: AYw changes suddenly, jump out of AYref−c, perform quick adjustment of Gr with large step length; stage 8: AYw changes suddenly, jump into AYref±c, slowly adjust Gr with small step length to AYref±a; stage 9: AYw falls into AYref±a, do not adjust.

The advantage of adopting the adjustment strategy of this exposure control parameter is that adjustment is performed by selecting a proper method based on the AYw deviation condition, which not only ensures quick response during sudden change, but also ensures precision of the adjustment control. Also, when AYw is deflected from the adequate threshold, a certain buffer range is provided to avoid frequent adjustment caused by a small flutter.

Figure 13:
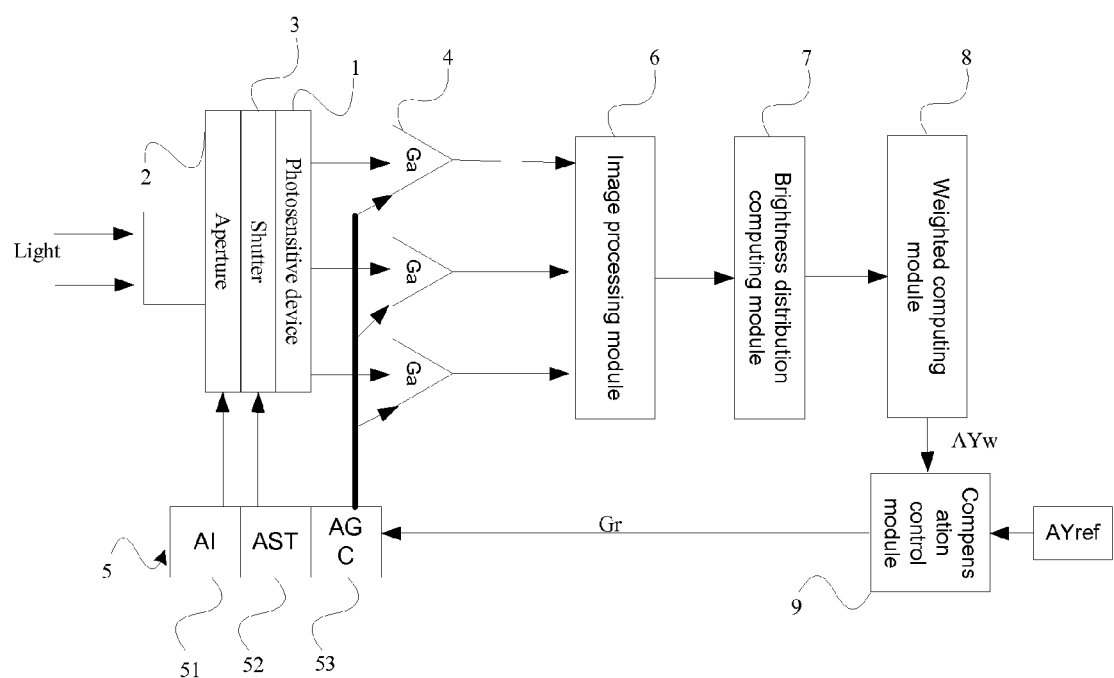
FIG. 13 is a schematic drawing showing the imaging device module structure in Application Example 9.

Application Example 9, a type of imaging device, as shown in the module structure in FIG. 13, includes a photosensitive device 1, an aperture 2, a shutter 3, an amplifier Ga 4, a relative photoelectric gain adjustment module 5, an image processing module 6, a brightness distribution computing module 7, a weighted computing module 8, and a compensation control module 9;

the photosensitive device 1 converts light passing through aperture 2 and shutter 3 into analog current signals; the amplifier Ga4 amplifies the output from the photosensitive device 1; the image processing module 6 converts the output of the amplifier Ga4 into digital image signals; the brightness distribution computing module 7 computes the brightness distribution of the aforementioned digital image signals; the weight computing module 8 distributes the corresponding weighted coefficient for different brightness regions based on the brightness distribution computing module 7 computing results, and computes the brightness weighted average value AYw of the aforementioned digital image signals; the compensation control module 9 decides the adjustment target of the relative photoelectric gain Gr based on the difference between the aforementioned brightness weighted average value and the brightness reference value;

the relative photoelectric gain adjustment module 5 includes three sub-modules: an automatic aperture control AI 51, an automatic shutter time control AST 52, and an automatic gain control AGC 53; these three sub-modules control aperture 2, shutter 3, the amplifier Ga 4, respectively, and perform the corresponding parameter adjustment to the controlled equipment modules based on the Gr adjustment target decided by compensation control module 9.

The aforementioned imaging device can be applied to the automatic exposure control method described in the aforementioned Application Examples 5~8 for carrying out automatic exposure control.

A detailed introduction of a method for acquiring automatic exposure control parameters and a corresponding controlling method and an imaging device provided by the present invention is given above. This paper uses specific individual cases to describe the principles and implementation modes of the present invention. The description of the above Application Example is only used to aid in understanding the method and core idea of the present invention; also, the technical personnel in this field may make changes to the embodiment and application scope according to the idea of the present invention. In summary, the content of this specification should not be understood as limitations for the present invention.

What is claimed is:

1. A method for acquiring a control parameter in automatic exposure control characterized by including:
   1) computing a brightness distribution of an exposure image, wherein computing a brightness distribution of an exposure image comprises dividing the brightness distribution into a number of bins and computing distribution of pixels for the exposure image in each bin;
   2) partitioning the exposure image into different brightness regions according to the brightness distribution, each of the different brightness regions having a different brightness, wherein partitioning the exposure image into different brightness regions comprises partitioning bright regions with specific widths and focusing on bins with peak values, at least partitioning the highest peak region and the second highest peak region in an entire brightness distribution;
   3) assigning corresponding weighted coefficients for the different brightness regions, based on the brightness of each of the different brightness regions;
   4) computing a weighted average value of brightness of the exposure image as said control parameter, using the brightness of the different brightness regions and the corresponding weighted coefficients for the different brightness regions;
   wherein a weighted coefficient for pixels of a peak value region is smaller than weighted coefficients of other regions, wherein the weighted coefficient assigned to the peak value region decreases with increase of pixel distribution in the peak value region, and after decreasing to a smallest weighted coefficient, maintains steady and increases after maintaining steady in a specific region, and wherein the smallest weighted coefficient corresponding to a peak value region with higher brightness of said highest peak region and second highest peak region increases with increase of a current relative photoelectric gain, and the smallest weighted coefficient corresponding to a peak value region with lower brightness decreases with increase of the current relative photoelectric gain.

2. The method for acquiring a control parameter in automatic exposure control according to claim 1, wherein said step 2) also includes:
   2b) judging whether the highest peak region overlaps with the second highest peak region, if they overlap, then, taking a third highest peak region as the second highest region, and so on and so forth, until the highest peak region and the second highest peak region do not overlap.

3. A method for acquiring a control parameter in automatic exposure control characterized by including:
   1) computing a brightness distribution of an exposure image, wherein computing a brightness distribution of an exposure image comprises dividing the brightness distribution into a number of bins and computing distribution of pixels for the exposure image in each bin;
   2) partitioning the exposure image into different brightness regions according to the brightness distribution, each of the different brightness regions having a different brightness, wherein partitioning the exposure image into different brightness regions comprises partitioning bright regions with specific widths and focusing on bins with peak values, at least partitioning the highest peak region and the second highest peak region in an entire brightness distribution;
   3) assigning corresponding weighted coefficients for the different brightness regions, based on the brightness of each of the different brightness regions;
   4) computing a weighted average value of brightness of the exposure image as said control parameter, using the brightness of the different brightness regions and the corresponding weighted coefficients for the different brightness regions;
   wherein a weighted coefficient for pixels of a peak value region is smaller than weighted coefficients of other regions, and wherein the weighted coefficient assigned to the peak value region decreases with increase of pixel distribution in the peak value region, and after decreasing to a smallest weighted coefficient, increases.

4. The method for acquiring a control parameter in automatic exposure control according to claim 3 wherein said step 2) further comprises:
   judging whether the highest peak region overlaps with the second highest peak region, if they overlap, then, taking a third highest peak region as the second highest region, and so on and so forth, until the highest peak region and the second highest peak region do not overlap.

* * * * *